United States Patent
Seo et al.

(10) Patent No.: US 12,014,114 B2
(45) Date of Patent: Jun. 18, 2024

(54) ELECTRONIC DEVICE FOR RESPONDING TO USER REACTION AND OUTSIDE SOUND AND OPERATING METHOD THEREOF

(71) Applicant: SAMSUNG ELECTRONICS CO., LTD., Suwon-si (KR)

(72) Inventors: Hyunson Seo, Gyeonggi-do (KR); Kyounggu Woo, Gyeonggi-do (KR); Sangho Lee, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 174 days.

(21) Appl. No.: 17/843,060

(22) Filed: Jun. 17, 2022

(65) Prior Publication Data

US 2022/0405045 A1 Dec. 22, 2022

Related U.S. Application Data

(63) Continuation of application No. PCT/KR2022/008277, filed on Jun. 13, 2022.

(30) Foreign Application Priority Data

Jun. 17, 2021 (KR) .......................... 10-2021-0078816

(51) Int. Cl.
*H03G 3/20* (2006.01)
*G06F 3/038* (2013.01)
(Continued)

(52) U.S. Cl.
CPC .............. *G06F 3/165* (2013.01); *G06F 3/038* (2013.01); *G10L 25/51* (2013.01); *H04R 1/1041* (2013.01);
(Continued)

(58) Field of Classification Search
CPC ......... G06F 3/165; G06F 3/038; G10L 25/51; H04R 1/1041; H04R 1/1083; H04R 1/326
See application file for complete search history.

(56) References Cited

U.S. PATENT DOCUMENTS 9,398,367 B1 7/2016 Scott et al.
9,794,699 B2 10/2017 Choi et al.
(Continued)

FOREIGN PATENT DOCUMENTS

JP 2018007256 A 1/2018
KR 101062344 B1 10/2005
(Continued)

OTHER PUBLICATIONS

International Search Report and Written Opinion with English Translation for International Application No. PCT/KR2022/008277; International Filing Date Jun. 13, 2022; dated Sep. 28, 2022; 10 pages.

*Primary Examiner* — Simon King
(74) *Attorney, Agent, or Firm* — CANTOR COLBURN LLP

(57) ABSTRACT

Disclosed is a wireless audio device, which includes at least one microphone, at least one speaker, at least one sensor, a processor, and a memory storing instructions, and the instructions that, when executed by the processor, cause the wireless audio device, while the wireless audio device outputs a sound for reducing an outside sound acquired through the at least one microphone through the at least one speaker, to identify a specified outside sound of the outside sound acquired through the at least one microphone, to output a notification sound for indicating that the specified outside sound is identified through the at least one speaker, to identify a motion of a user of the wireless audio device through the at least one sensor, in response to outputting the notification sound, and to stop the output of the sound for reducing the outside sound based on the identified motion.

20 Claims, 12 Drawing Sheets

(51) Int. Cl.
*G06F 3/16* (2006.01)
*G10L 25/51* (2013.01)
*H04R 1/10* (2006.01)
*H04R 1/32* (2006.01)
*G06F 1/16* (2006.01)

(52) U.S. Cl.
CPC ........... H04R 1/1083 (2013.01); H04R 1/326 (2013.01); *G06F 1/163* (2013.01); *H04R 1/1016* (2013.01)

(56) References Cited

U.S. PATENT DOCUMENTS

| | | | |
|---|---|---|---|
| 9,984,673 B2 * | 5/2018 | Jung | G10K 11/17881 |
| 10,489,109 B2 | 11/2019 | Baek et al. | |
| 10,679,602 B2 | 6/2020 | Lovitt et al. | |
| 11,315,541 B1 | 4/2022 | Lovitt et al. | |
| 11,330,384 B2 | 5/2022 | Lee et al. | |
| 2017/0345408 A1 | 11/2017 | Hong et al. | |
| 2018/0157044 A1 | 6/2018 | Choi et al. | |
| 2019/0096230 A1 * | 3/2019 | Tanabe | H04W 4/90 |
| 2019/0246235 A1 | 8/2019 | Bruser et al. | |
| 2023/0116597 A1 * | 4/2023 | Yamamoto | G10K 11/17837 |
| | | | 381/71.2 |

FOREIGN PATENT DOCUMENTS

| | | |
|---|---|---|
| KR | 20140084367 A | 7/2014 |
| KR | 101735484 B1 | 5/2017 |
| KR | 20170055329 A | 5/2017 |
| KR | 101756674 B1 | 7/2017 |
| KR | 20210056146 A | 5/2021 |
| WO | 2020086104 A1 | 4/2020 |

* cited by examiner

ELECTRONIC DEVICE FOR RESPONDING TO USER REACTION AND OUTSIDE SOUND AND OPERATING METHOD THEREOF

TECHNICAL FIELD

The disclosure relates to an electronic device for responding to a user reaction and an outside sound and operating method thereof.

BACKGROUND ART

Wireless audio devices, such as earbuds, are widely used. A wireless audio device may be wirelessly connected to an electronic device, such as a mobile phone, to output audio data received from the mobile phone.

The wireless audio device may block ambient sounds such that the wearer of the wireless audio device is not disturbed by outside sounds. For example, the wireless audio device may provide a noise-free environment to a user by outputting a sound opposite to a sound received by a microphone of the wireless audio device in real time.

DISCLOSURE

Technical Problem

When ambient sounds are blocked, it may be difficult for users to react to an unexpected situation around them. When the users are unable to respond to the unexpected situation, the users' experience of the wireless audio device may be deteriorated.

Accordingly, a function of the wireless audio device to guide the user about the unexpected situation may be required, and a function of actively blocking ambient sounds may be required.

Technical Solution

According to an embodiment disclosed herein, a wireless audio device includes at least one microphone, at least one speaker, at least one sensor, a processor, and a memory that stores instructions, and the instructions that, when executed by the processor, cause the wireless audio device, while a sound for reducing an outside sound acquired through the at least one microphone is output through the at least one speaker, to identify a specified outside sound of the outside sound acquired through the at least one microphone, to output a notification sound for indicating that the specified outside sound is identified through the at least one speaker, to identify a motion of a user of the wireless audio device through the at least one sensor, in response to outputting the notification sound, and to stop the output of the sound for reducing the outside sound based on the identified motion.

According to an embodiment disclosed herein, a method of operating a wireless audio device includes, while a sound for reducing an outside sound acquired through at least one microphone of the wireless audio device is output through at least one speaker of the wireless audio device, identifying a specified outside sound of the outside sound acquired through the at least one microphone, outputting a notification sound for indicating that the specified outside sound is identified through at least one speaker, identifying a motion of a user of the wireless audio device through at least one sensor of the wireless audio device, in response to outputting the notification sound, and stopping the output of the sound for reducing the outside sound based on the identified motion.

According to an embodiment disclosed herein, a wireless audio system includes at least two microphones, at least two speakers, at least one sensor, at least one processor, and at least one memory which stores instructions. The instructions that, when executed by the at least one processor, cause the wireless audio system, while a sound for reducing an outside sound acquired through one or more of the at least two microphones is output through one or more of the at least two speakers, to identify a specified outside sound of the outside sound acquired, to output a notification for indicating that the specified outside sound is identified, to identify a motion of a user of the wireless audio system through the at least one sensor, in response to outputting the notification, and to stop the output of the sound for reducing the outside sound based on the identified motion.

The technical problems to be achieved in the various embodiments of the disclosure are not limited to the technical problems mentioned above, another technical problems not mentioned will be clearly understood by those of ordinary skill in the art to which the disclosure belongs from the following description.

Advantageous Effects

According to various embodiments disclosed herein, a wireless audio device may guide a user about the unexpected situation.

According to various embodiments disclosed herein, a wireless audio device may actively block ambient sounds.

The effects that are achieved through various embodiments of the disclosure may not be limited to what has been particularly described herein, and other advantages not described herein may be more clearly understood from the following detailed description by persons skilled in the art.

With regard to description of drawings, the same or similar components will be marked by the same or similar reference signs.

MODE FOR INVENTION

Figure 1:
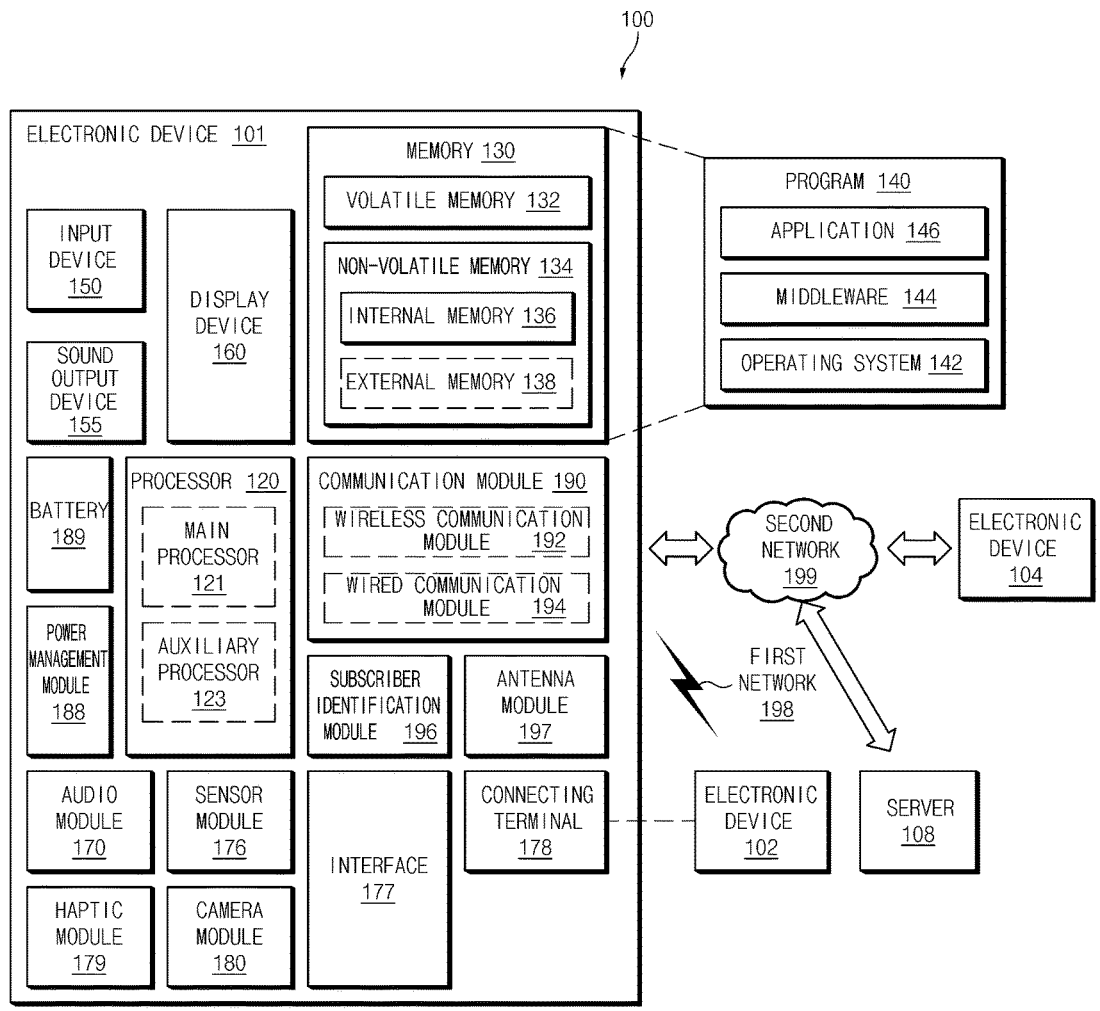
FIG. 1 is a block diagram of an electronic device in a network environment, according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
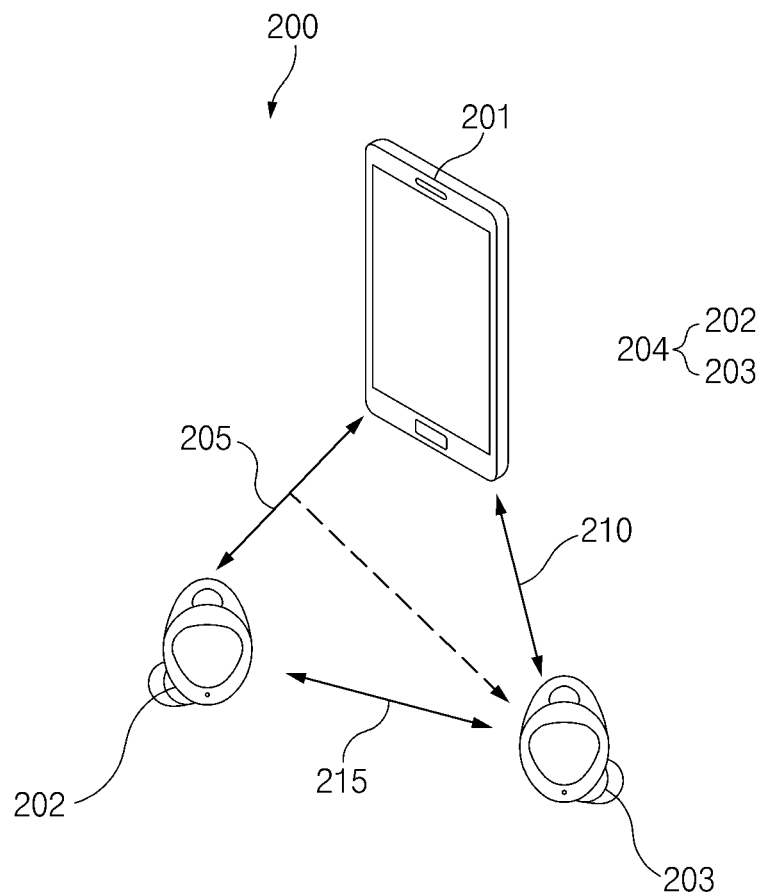
FIG. 2A illustrates a communication environment between a wireless audio device and an electronic device, according to an embodiment of the disclosure.
Figure 2B:
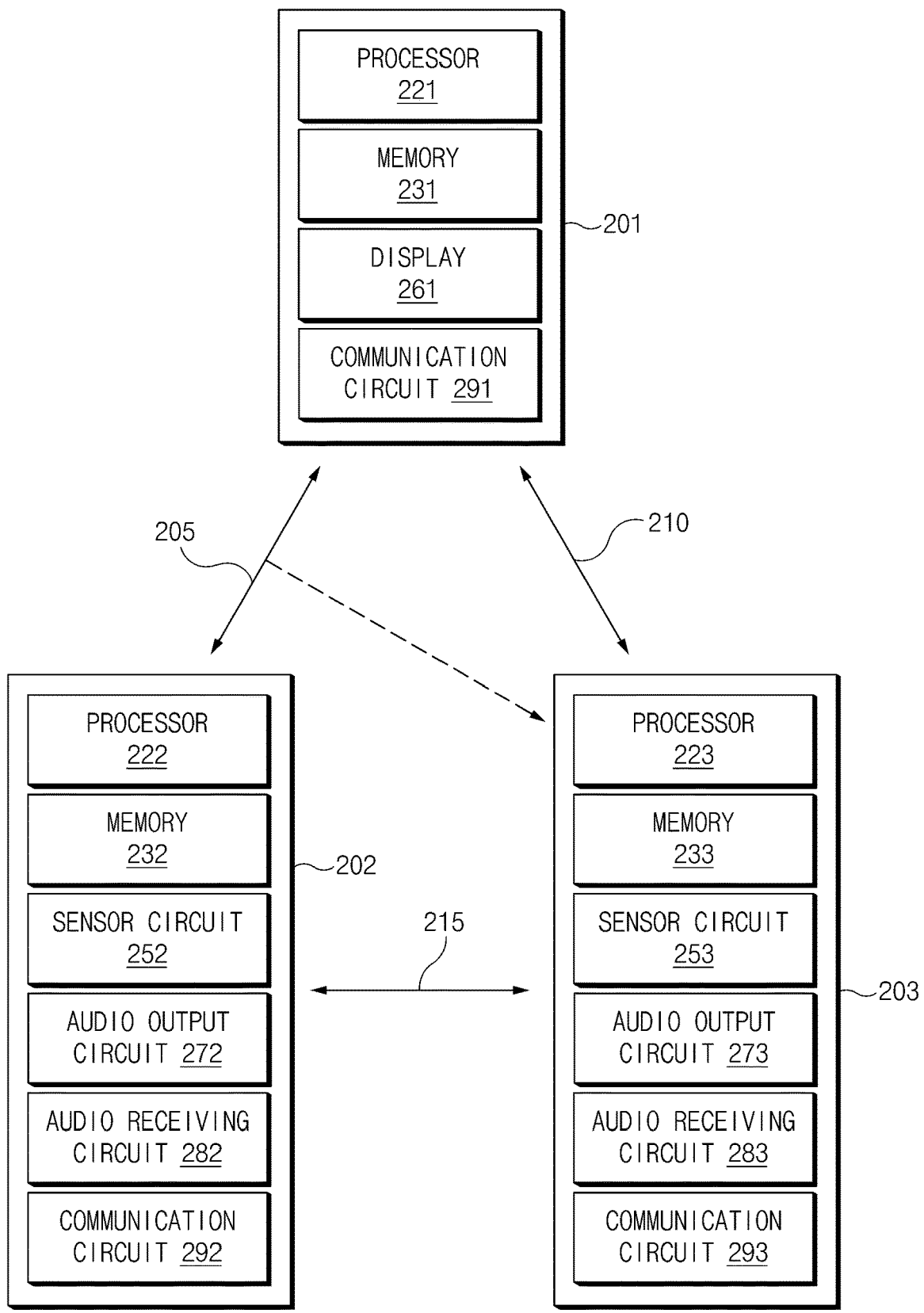
FIG. 2B illustrates a block diagram of an electronic device and wireless audio devices, according to an embodiment of the disclosure.
Figure 2C:
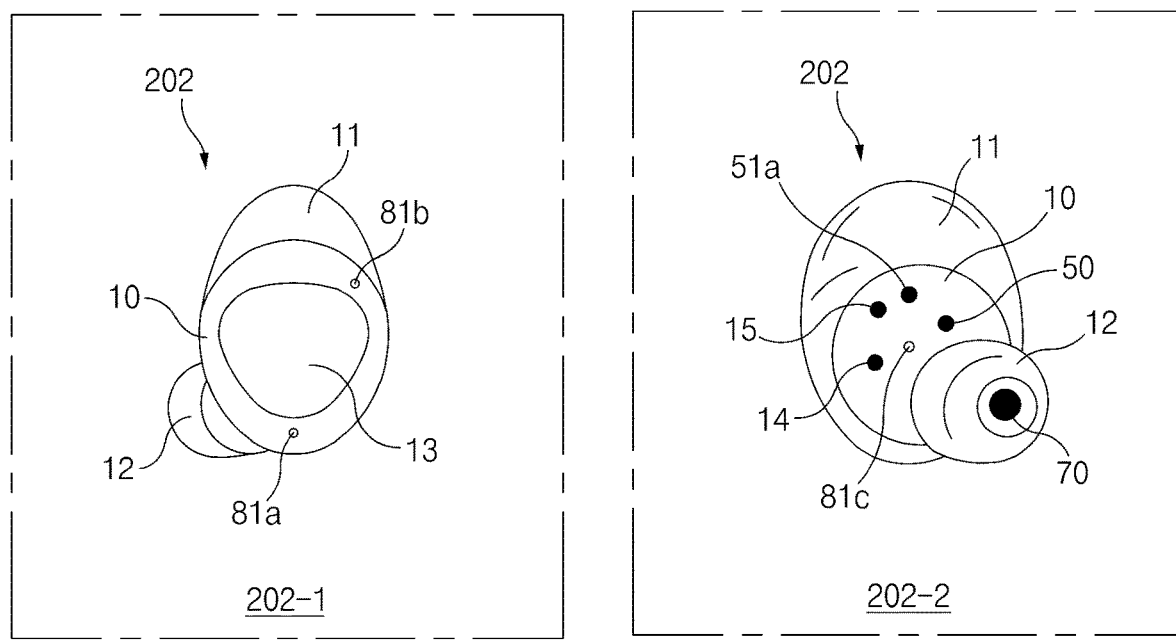
FIG. 2C illustrates a front view and a rear view of a first wireless audio device, according to an embodiment of the disclosure.

FIG. 2A illustrates a communication environment 200 between a wireless audio device 204 (also referred to as a wireless audio system 204) and an electronic device 201, according to an embodiment of the disclosure. FIG. 2B illustrates a block diagram of the electronic device 201 and wireless audio devices 202 and 203, according to an embodiment of the disclosure. FIG. 2C illustrates a front view 202-1 and a rear view 202-2 of the first wireless audio device 202, according to an embodiment of the disclosure.

In an embodiment, the electronic device 201 and the wireless audio device 204 (e.g., the first wireless audio device 202 and/or the second wireless audio device 203) may include at least some of the same or similar components to those of the electronic device 101 illustrated in FIG. 1, and may perform at least some of the same or similar functions as the electronic device 101 illustrated in FIG. 1. Hereinafter, the term "wireless audio device 204" may be referred to as the first wireless audio device 202, the second wireless audio device 203, or the first and second wireless audio devices 202 and 203, unless otherwise described. In an embodiment, the electronic device 201 may be a user terminal such as a smartphone, a tablet, a desktop computer, or a laptop computer. In an embodiment, the wireless audio device 204 may be a wireless earphone, a headset, an earbud, or a speaker. However, the electronic device 201 and/or the wireless audio device 204 are not limited to the above-described examples. In an embodiment, the wireless audio device 204 may include various types of devices (e.g., hearing aids, or portable sound devices) that receive an audio signal and output the received audio signal. In an embodiment, the term "wireless audio device" is used to distinguish it from the electronic device 201, and "wireless audio device" may be referred to as an electronic device, a wireless earphone, an earbud, a true wireless stereo (TWS), or an ear set.

In an embodiment, the electronic device 201 and the wireless audio device 204 may perform wireless communication in a short distance according to a Bluetooth network defined by a Bluetooth™ special interest group (SIG). In an embodiment, the Bluetooth network may include a Bluetooth legacy network or a BLE network. In an embodiment, the electronic device 201 and the wireless audio device 204 may perform wireless communication through one of the Bluetooth legacy network and the BLE network, or may perform wireless communication through two networks.

In an embodiment, with respect to a link (e.g., a first link 205 and/or a second link 210) generated between the electronic device 201 and the wireless audio device 204, the electronic device 201 may serve as a primary device (e.g., a master device), and the wireless audio device 204 may serve as a secondary device (e.g., a slave device). In an embodiment, with respect to a link (e.g., a third link 215) generated between the first wireless audio device 202 and the second wireless audio device 203, one device (e.g., the first wireless audio device 202) of the first wireless audio device 202 and the second wireless audio device 203 may serve as a primary device, and another device (e.g., the second wireless audio device 203) may serve as a secondary device.

In an embodiment, the second wireless audio device 203 may monitor the first link 205 using information related to the first link 205. In another embodiment, the first wireless audio device 202 may monitor the second link 210 using information related to the second link 210.

Referring to FIG. 2B, the electronic device 201 may include a processor 221 (e.g., the processor 120 of FIG. 1), a memory 231 (e.g., the memory 130 of FIG. 1), a communication circuit 291 (e.g., the communication module 190 of FIG. 1), and/or a display 261 (e.g., the display module 160 of FIG. 1).

In an embodiment, the first wireless audio device 202 may include a processor 222 (e.g., the processor 120 of FIG. 1), a memory 232 (e.g., the memory 130 of FIG. 1), a sensor circuit 252 (e.g., the sensor module 176 of FIG. 1), an audio output circuit 272 (e.g., the audio module 170 of FIG. 1), an audio receiving circuit 282 (e.g., the audio module 170 of FIG. 1), and/or a communication circuit 292 (e.g., the communication module 190 of FIG. 1).

In an embodiment, the sensor circuit 252 may include at least one sensor. The sensor circuit 252 may detect information on a wearing state of the first wireless audio device 202, biometric information of a wearer, and/or a movement of the wearer. In an embodiment, the sensor circuit 252 may include a proximity sensor for detecting a wearing state, a biometric sensor (e.g., a heart rate sensor) for detecting biometric information, and/or a motion sensor (e.g., an acceleration sensor) for motion detection. In an embodiment, the sensor circuit 252 may further include at least one of a bone conduction sensor and an acceleration sensor. In an embodiment, the bone conduction sensor may be disposed close to a skin to detect bone conduction. In an embodiment, the acceleration sensor may be used to detect shaking/vibration information in, for instance, kHz units using sampling in kHz units that is relatively higher than a general movement sampling. In an embodiment, the processor 222 may perform a voice identification, a voice detection, a tap detection, and/or a wear detection under a noisy environment using a vibration centered on a significant axis (e.g., at least one of x, y, and z axes) among vibration information of the acceleration sensor.

In an embodiment, the audio output circuit 272 may be set to output a sound according to an audio signal.

In an embodiment, the audio receiving circuit 282 may include one or a plurality of microphones. In an embodiment, the audio receiving circuit 282 may be set to acquire an audio signal using one or a plurality of microphones. In an embodiment, each of the plurality of microphones may correspond to a different audio reception path. In an embodiment, when the audio receiving circuit 282 includes a first microphone and a second microphone (e.g., a first microphone 81a and a second microphone 81b of FIG. 2C), the audio signal obtained by the first microphone and the audio signal by the second microphone may be referred to as different audio channels.

In an embodiment, the processor 222 may acquire audio data by using at least one microphone among the plurality of microphones connected to the audio receiving circuit 282. In an embodiment, the processor 222 may dynamically select or determine at least one microphone for acquiring the audio data among the plurality of microphones. In an embodiment, the processor 222 may acquire the audio data by performing beamforming using the plurality of microphones.

In an embodiment, the processor 222 may acquire the audio data using at least one of the audio receiving circuit 282 and the sensor circuit 252. In an embodiment, the processor 222 may acquire the audio data using one or more microphones connected to the audio receiving circuit 282. In an embodiment, the processor 222 may acquire the audio data by detecting a vibration corresponding to the audio signal using the sensor circuit 252. In an embodiment, the processor 222 may acquire the audio data using at least one of a motion sensor, a bone conduction sensor, and an acceleration sensor. In an embodiment, the processor 222 may be set to process (e.g., noise suppression, noise cancellation, or echo cancellation) the audio data acquired through various paths (at least one of the audio receiving circuit 282 and the sensor circuit 252).

In an embodiment, the second wireless audio device 203 may include a processor 223 (e.g., the processor 120 of FIG. 1), a memory 233 (e.g., the memory 130 of FIG. 1), a sensor circuit 253 (e.g., the sensor module 176 of FIG. 1), an audio output circuit 273 (e.g., the audio module 170 of FIG. 1), an audio receiving circuit 283, and/or a communication circuit 293 (e.g., the communication module 190 of FIG. 1).

In an embodiment, the processor 223, the memory 233, the sensor circuit 253, the audio output circuit 273, the audio receiving circuit 283, and/or the communication circuit 293 of the second wireless audio device 203 may perform the same and/or similar functions as the processor 222, the memory 232, the sensor circuit 252, the audio output circuit 272, the audio receiving circuit 282, and/or the communication circuit 292 of the first wireless audio device 202.

With reference to FIG. 2C, a structure of the first wireless audio device 202 will be described. Thus, for convenience of description, additional description will be omitted to avoid redundancy. In an embodiment, the second wireless audio device 203 may also have the same or similar structure as the first wireless audio device 202.

Reference numeral 202-1 denotes a front view of the first wireless audio device 202. In an embodiment, the first wireless audio device 202 may include a housing 10. In an embodiment, the housing 10 may form at least a portion of an exterior of the first wireless audio device 202.

In an embodiment, a button 13 and a plurality of microphones 81a and 81b may be disposed on a first side (e.g., a side facing outward when worn) of the housing 10. In an embodiment, a wing tip 11 may be coupled to the circumference of the housing 10. The wing tip 11 may be formed of an elastic material. The wing tip 11 may be detached from the housing 10 or attached to the housing 10. The wing tip 11 may improve wearability of the first wireless audio device 202.

In an embodiment, the button 13 may be set to receive a user input (e.g., a touch input or a push input).

In an embodiment, the first microphone 81a and the second microphone 81b may be included in the audio receiving circuit 282 of FIG. 2B. In an embodiment, the first microphone 81a and the second microphone 81b may be disposed to detect a sound directed to the user when the first wireless audio device 202 is worn. In an embodiment, the first microphone 81a and the second microphone 81b may be referred to as external microphones.

In an embodiment, the first microphone 81a and the second microphone 81b may detect a sound outside the housing 10. In an embodiment, the first microphone 81a and the second microphone 81b may detect a sound generated in the vicinity of the first wireless audio device 202. In an embodiment, the first wireless audio device 202 may output the sound of the surrounding environment sensed by the first microphone 81a and the second microphone 81b through a speaker 70. In an embodiment, the first microphone 81a and the second microphone 81b may be a sound pickup microphone for a noise cancellation function (e.g., an active noise cancellation (ANC)) of the first wireless audio device 202. In an embodiment, the first microphone 81a and the second microphone 81b may be a sound pickup microphone for a function of listening to an ambient sound (e.g., a transparency function or an ambient aware function) of the first wireless audio device 202.

Reference numeral 202-2 denotes a rear view of the first wireless audio device 202. In an embodiment, a first electrode 14, a second electrode 15, a proximity sensor 50, a third microphone 81c, and the speaker 70 may be disposed on a second side (e.g., a side facing a user when worn) of the housing 10.

In an embodiment, the speaker 70 may be included in the audio output circuit 272 of FIG. 2B. The speaker 70 may convert an electrical signal into a sound signal. In an embodiment, the speaker 70 may output the sound to the outside of the first wireless audio device 202. In an embodiment, the speaker 70 may convert an electrical signal into a sound that a user can audibly recognize and may output the sound. In an embodiment, at least a portion of the speaker 70 may be disposed inside the housing 10. In an embodiment, the speaker 70 may be coupled to an ear tip 12 through one end of the housing 10.

In an embodiment, the ear tip 12 may be formed of an elastic material (or flexible material). The ear tip 12 may assist the first wireless audio device 202 to be inserted in close contact with the user's ear. In an embodiment, at least a portion of the ear tip 12 may be deformed according to a shape (e.g., a shape of an ear canal) of an external object.

In an embodiment, the ear tip 12 may be formed in a cylindrical shape with a hollow formed therein. In an embodiment, when the ear tip 12 is coupled to the housing 10, the sound (audio) output from the speaker 70 may be transferred through the hollow of the ear tip 12 to an external object (e.g., the user).

In an embodiment, the first electrode 14 and the second electrode 15 may be connected to an external power source (e.g., a case) and may receive an electrical signal from the external power source.

In an embodiment, the first wireless audio device 202 may include a sensor 51a (e.g., an acceleration sensor, a bone conduction sensor, and/or a gyro sensor) disposed on a second side of the housing 10. The position and shape of the sensor 51a illustrated in FIG. 2C are an example, and embodiments of the disclosure are not limited thereto. In an embodiment, the sensor 51a is disposed inside the housing 10 and may not be exposed to the outside. In an embodiment, the sensor 51a may be located at a position capable of contacting the wearer's ear or at a portion of the housing 10 in contact with the wearer's ear when worn.

In an embodiment, the proximity sensor 50 may be used to detect a wearing state of the user. In an embodiment, the proximity sensor 50 may be disposed inside the housing 10. In an embodiment, at least a portion of the proximity sensor 50 may be disposed to be exposed to the exterior of the first wireless audio device 202. In an embodiment, the first wireless audio device 202 may determine whether the first wireless audio device 202 is worn by the user based on data measured by the proximity sensor 50. In an embodiment, the proximity sensor 50 may include an infrared (IR) sensor. In an embodiment, the IR sensor may detect whether the housing 10 is in contact with the user's body, and the first wireless audio device 202 may determine whether the first wireless audio device 202 is worn based on the detection of the IR sensor. In an embodiment, the proximity sensor 50 is not limited to an IR sensor, and may be implemented using various types of sensors (e.g., an acceleration sensor or a gyro sensor).

In an embodiment, the third microphone 81c may be disposed to detect a sound in a direction away from the user when the first wireless audio device 202 is worn. In an embodiment, the third microphone 81c may be referred to as an internal microphone.

Figure 3A:
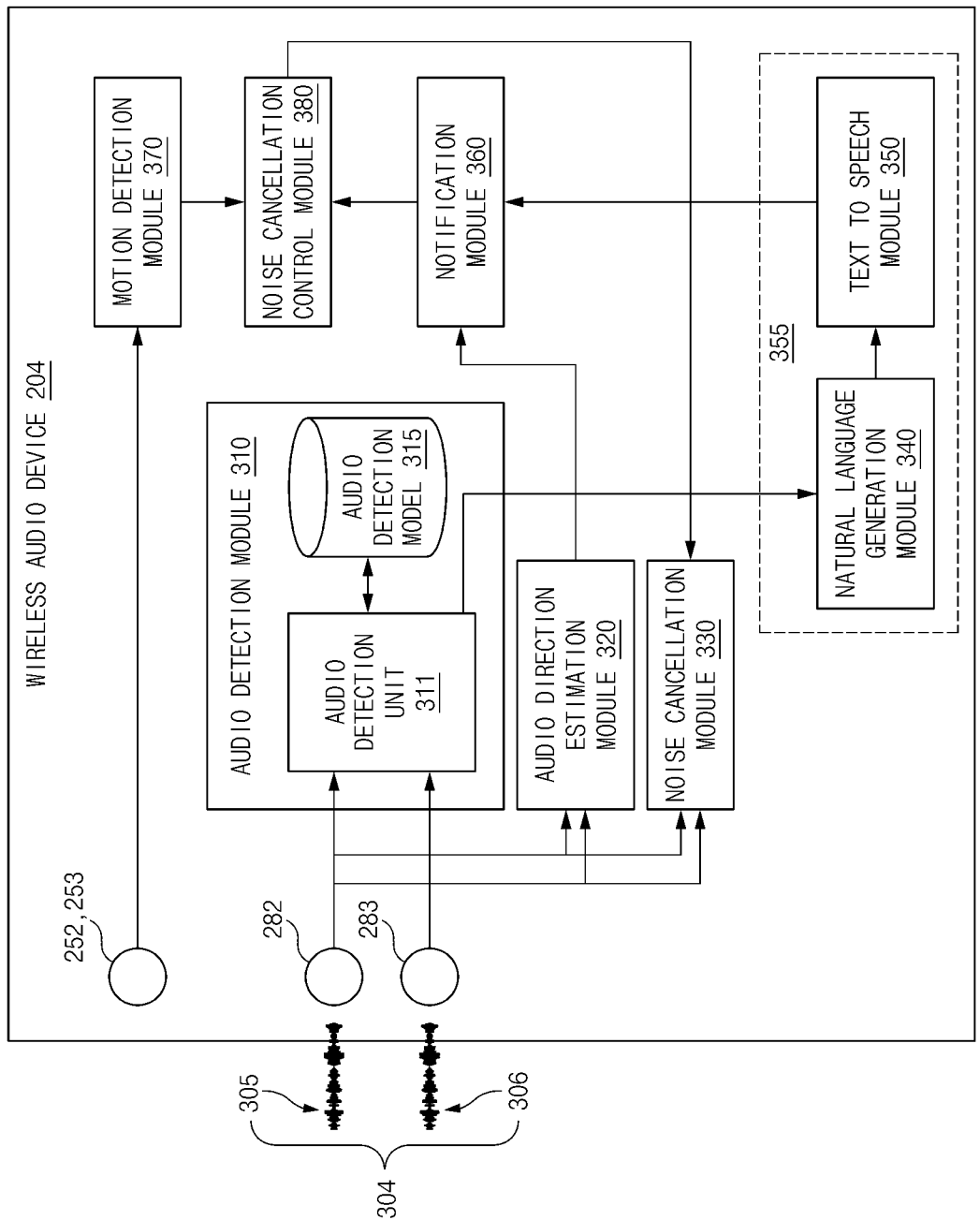
FIG. 3A is a block diagram for describing an operation in which a wireless audio device, according to an embodiment of the disclosure provides responsiveness to an outside sound.
Figure 3B:
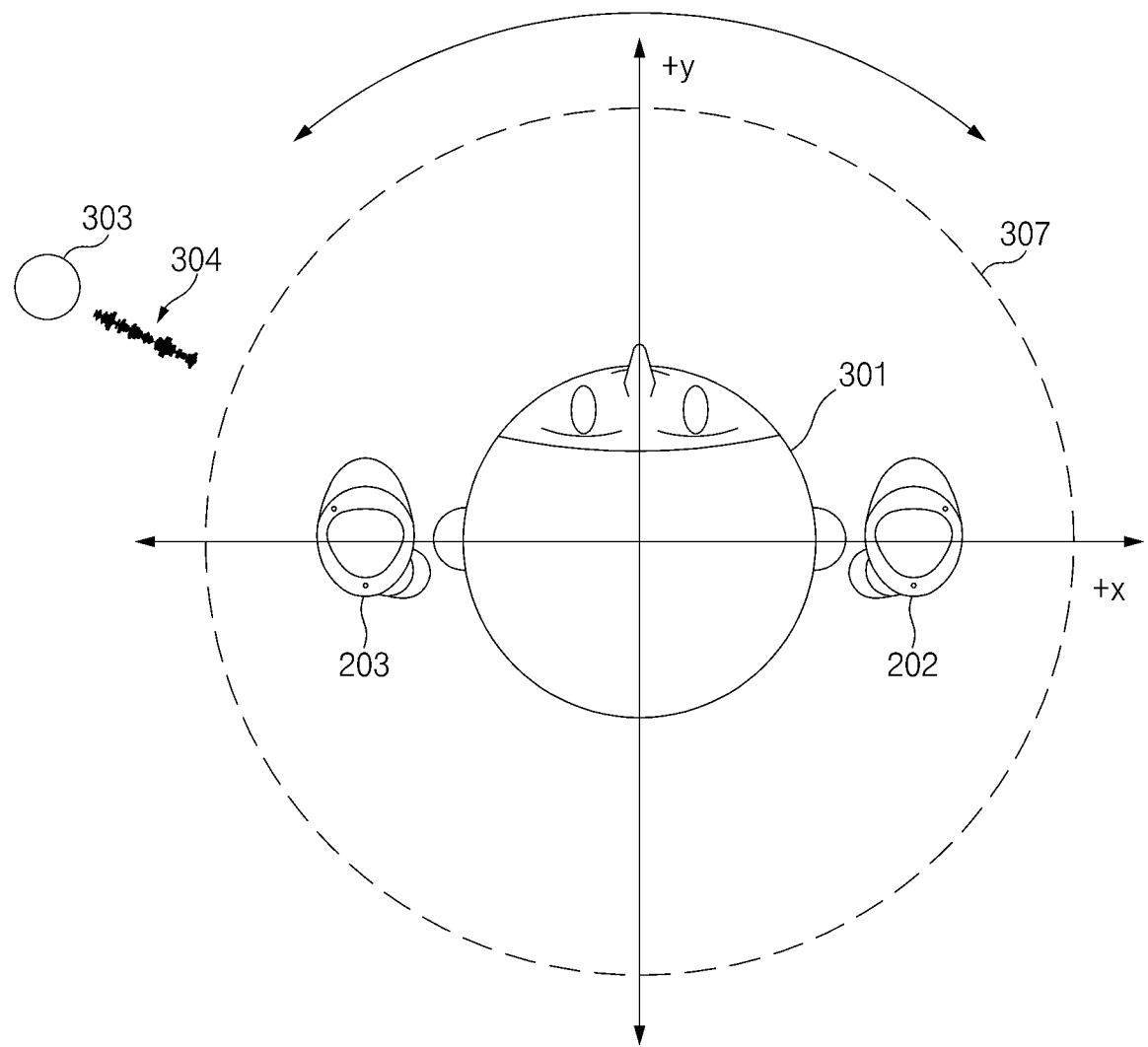
FIG. 3B is a diagram illustrating a situation in which a user of a wireless audio device, according to an embodiment of the disclosure reacts to an outside sound.
Figure 3C:
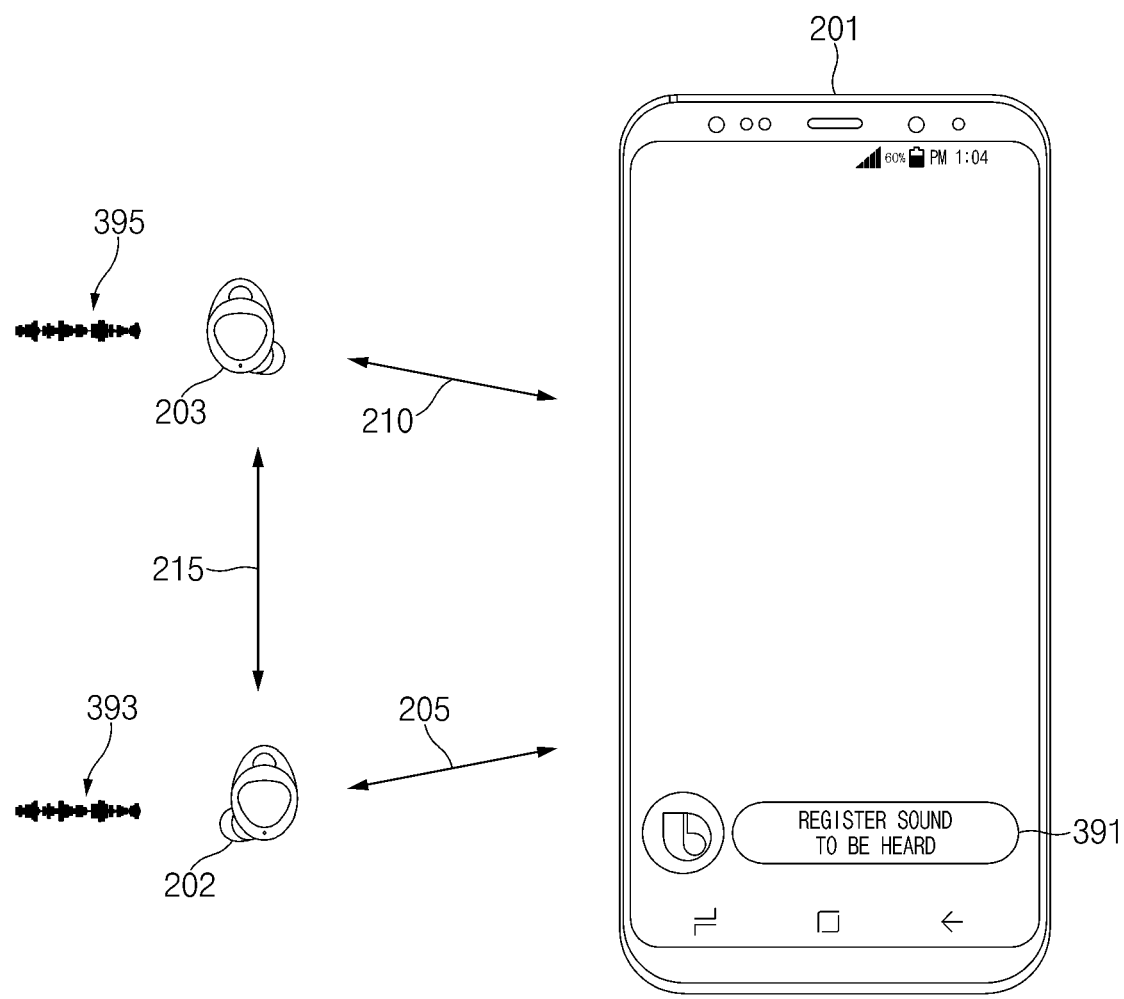
FIG. 3C is a diagram illustrating a situation in which a user of a wireless audio device, according to an embodiment of the disclosure registers a specified sound.

FIG. 3A is a block diagram for describing an operation in which the wireless audio device 204, according to an embodiment of the disclosure provides responsiveness to an outside sound. FIG. 3B is a diagram illustrating a situation in which a user of the wireless audio device 204, according to an embodiment of the disclosure reacts to an outside sound. FIG. 3C is a diagram illustrating a situation in which a user of the wireless audio device 204, according to an embodiment of the disclosure registers a specified sound.

In an embodiment, the wireless audio device 204 may include an audio detection module 310, an audio direction estimation module 320, a noise cancellation module 330, a natural language generation module 340, a text to speech (TTS) module 350, a notification module 360, a motion detection module 370, a noise cancellation control module 380, or a combination thereof. In an embodiment, some of the modules of the wireless audio device 204 may be implemented in an external electronic device (e.g., the electronic device 201). For example, the natural language generation module 340 or the TTS module 350 may be implemented in the electronic device 201 as distributed processing tasks 355. In an embodiment, when some modules are implemented in an external electronic device as part of distributed processing tasks 355, a module implemented in the external electronic device and a module of the wireless audio device 204 may exchange data through a link (e.g., the first link 205 and/or the second link 210).

In an embodiment, the audio detection module 310, the audio direction estimation module 320, the noise cancellation module 330, the natural language generation module 340, the TTS module 350, the notification module 360, the motion detection module 370, and the noise cancellation control module 380 may be implemented in software in the first wireless audio device 202, the second wireless audio device 203, or a combination thereof. For example, the audio detection module 310, the audio direction estimation module 320, the noise cancellation module 330, the natural language generation module 340, the TTS module 350, the notification module 360, the motion detection module 370, and the noise cancellation control module 380 may be implemented in software to be executable by the processor 222 of the first wireless audio device 202. For example, the audio detection module 310, the audio direction estimation module 320, the noise cancellation module 330, the natural language generation module 340, the TTS module 350, the notification module 360, the motion detection module 370, and the noise cancellation control module 380 may be implemented in software to be executable by the processor 223 of the second wireless audio device 203. In an embodiment, the audio detection module 310, the audio direction estimation module 320, the noise cancellation module 330, the natural language generation module 340, the TTS module 350, the notification module 360, the motion detection module 370, and the noise cancellation control module 380 may be implemented in hardware in the first wireless audio device 202, the second wireless audio device 203, or a combination thereof.

In an embodiment, the audio detection module 310 may include an audio detection unit 311 and/or an audio detection model 315. In an embodiment, the audio detection model 315 may be an artificial intelligence model for identifying whether a specified audio signal is included in a target audio signal and/or the type of the specified audio signal. In an embodiment, the audio detection model 315 may be a database for specified audio signals.

In an embodiment, the audio detection unit 311 may identify a specified audio signal from an audio signal 304 generated from an outside sound source 303. In an embodiment, the audio detection unit 311 may identify a specified audio signal from the audio signal 304 obtained by the audio receiving circuits 282 and 283. In an embodiment, the audio detection unit 311 may identify a specified audio signal from the obtained audio signal 304 with reference to the audio detection model 315. In an embodiment, the audio detection unit 311 may identify a specified audio signal by inputting the obtained audio signal 304 to the audio detection model 315.

According to an embodiment, the specified audio signal may include an audio signal indicating a specified keyword. In an embodiment, the specified keyword may include a user's name, a name (e.g., a mom, a dad, a teacher) indicating a social relationship with the user, keywords (e.g., bus stop information) registered by the user, or a combination thereof. According to an embodiment, the specified audio signal may include an audio signal of a specified pattern. In an embodiment, the specified pattern may include horns, sirens, alarms, animal sounds, baby sounds, living noises (e.g., a sound of boiling water), a sound registered by the user, or a pattern according to a combination thereof.

In an embodiment, the wireless audio device 204 may acquire an outside sound through the audio receiving circuits 282 and 283 based on a user's sound registration request, and may train (or retrain) the audio detection model 315 based on the acquired outside sound. In an embodiment, the wireless audio device 204 may register the acquired outside sound to the wireless audio device 204 by training (or re-training) the audio detection model 315. In an embodiment, the wireless audio device 204 may acquire a sound recorded through the electronic device 201 based on a user's sound registration request, and may train (or retrain) the audio detection model 315 based on the recorded sound. In an embodiment, the wireless audio device 204 may register the acquired recorded sound to the wireless audio device 204 by training (or re-training) the audio detection model 315. In an embodiment, the recorded sound may be a sound recorded directly by the electronic device 201 or a sound received from the outside (e.g., the server 108).

In an embodiment, a user may request sound registration through the electronic device 201. For example, referring to FIG. 3C, a user may input a voice input of "register a sound to be heard!" into the wireless audio device 204 and/or the electronic device 201. In an embodiment, when the wireless audio device 204 and/or the electronic device 201 recognizes the user's sound registration request, the wireless audio device 204 and/or the electronic device 201 may output contents indicating that the sound registration request is recognized. For example, the electronic device 201 may output a display 391 indicating a voice input of "register a sound to be heard!". Then, the wireless audio device 204 and/or the electronic device 201 may receive input audio signals 393 and 395, and may train (or retrain) the audio detection model 315 based on the received audio signals 393 and 395.

In an embodiment, the specified audio signal may be set differently depending on the current time and/or the position of the wireless audio device 204. In this case, the audio detection unit 311 may identify at least one specified audio signal among a plurality of specified audio signals based on the current time and/or the position of the wireless audio device 204, and may identify at least one specified audio signal from the audio signal 304 generated from the outside sound source 303. In an embodiment, the position of the wireless audio device 204 may be identified through the sensor circuits 252 and 253.

In an embodiment, the audio detection unit 311 may identify a meaning indicated by a specified audio signal identified from the audio signal 304 generated from the outside sound source 303. For example, when the specified audio signal identified from the audio signal 304 generated from the outside sound source 303 is a baby crying sound (or a pet crying sound), the audio detection unit 311 may identify a meaning (e.g., hunger ("neh"), gas ("eairh"), discomfort ("heh"), and sleepiness ("owh") indicated by the baby crying sound (e.g., "neh", "eairh", "heh", and "owh").

In an embodiment, the audio direction estimation module 320 may estimate a direction of the audio signal 304. In an embodiment, the audio direction estimation module 320 may estimate the direction of the audio signal 304, based on a difference between a first audio signal 305 obtained through the audio receiving circuit 282 and a second audio signal 306 obtained through the audio receiving circuit 283. In an embodiment, the first audio signal 305 may be an audio signal obtained through the audio receiving circuit 282 among the audio signals 304. In an embodiment, the second audio signal 306 may be an audio signal obtained through the audio receiving circuit 283 among the audio signals 304. Differences between audio signals detected through multiple microphones 81a, 81b, and 81c of a same wireless audio device (e.g., first wireless audio device 202 or second wireless audio device 203) can be used in estimating the direction of the audio signal 304.

In an embodiment, the audio direction estimation module 320 may estimate the direction of the audio signal 304, based on an interaural intensity difference (IID) between the first audio signal 305 and the second audio signal 306, an interaural time delay (ITD) between the first audio signal 305 and the second audio signal 306, or a combination thereof. In an embodiment, the direction may mean a direction of an outside sound from the sound source 303 to a user 301 in a three-dimensional space 307 surrounding the user 301.

In an embodiment, the noise cancellation module 330 may generate an audio signal for reducing (or canceling) the audio signal 304. In an embodiment, the noise cancellation module 330 may generate an audio signal for reducing (or canceling) an audio signal of a specified frequency among the audio signals 304. In an embodiment, the noise cancellation module 330 may generate an audio signal for reducing (or canceling) an amplitude of the audio signal 304. In an embodiment, a phase of the audio signal for reducing (or canceling) the amplitude of the audio signal 304 may be different from the phase of the audio signal 304 by 180 degrees.

In an embodiment, the noise cancellation module 330 may output an audio signal for reducing (or canceling) the audio signal 304 through the audio output circuits 272 and 273. In an embodiment, when the audio signal for reducing (or canceling) the audio signal 304 is output, a noise cancellation may be referred to as being turned on. In an embodiment, when the audio signal for reducing (or canceling) the audio signal 304 is not output, the noise cancellation may be referred to as being turned off.

In an embodiment, the natural language generation module 340 may receive information on the audio signal 304 from the audio detection module 310. In an embodiment, the natural language generation module 340 may receive information on a specified audio signal included in the audio signal 304.

In an embodiment, the natural language generation module 340 may generate text data for representing the specified audio signal. In an embodiment, the natural language generation module 340 may change information on the specified audio signal into the text data. According to an embodiment, the text data may include a text in the form of natural language utterances. For example, when a specified audio signal included in the audio signal 304 represents a specified keyword (e.g., a user's name (e.g., John)), the text data may be expressed as 'called John'. For example, when a specified audio signal included in the audio signal 304 represents a specified keyword (e.g., keywords registered by a user (e.g., Seoul station)), the text data may be expressed as 'you have arrived at Seoul station'. For example, when a specified audio signal included in the audio signal 304 represents an audio signal of a specified pattern (e.g., horn), the text data may be expressed as 'horn sounded'.

In an embodiment, the natural language generation module 340 may generate text data for representing a meaning of the specified audio signal. For example, when generating text data to represent a baby's crying sound, the natural language generation module 340 may generate different text data (e.g., "the baby says he's hungry", or "the baby says he's sleepy").

In an embodiment, the TTS module 350 may receive text data from the natural language generation module 340. In an embodiment, the TTS module 350 may change text data into audio data.

In an embodiment, the notification module 360 may provide a notification about a specified audio signal included in the audio signal 304 to the user 301 based on the audio data. In an embodiment, the notification module 360 may provide a notification about a specified audio signal through the audio output circuits 272 and 273. In an embodiment, the notification about the specified audio signal may also be referred to as a notification signal.

In an embodiment, the notification module 360 may provide a notification about a specified audio signal based on the direction estimated with respect to the audio signal 304. In an embodiment, the notification module 360 may provide a notification about the specified audio signal such that the interaural intensity difference (IID), the interaural time delay (ITD), or a combination thereof, between the notification output through the audio output circuit 272 and the notification output through the audio output circuit 273 correspond to the interaural intensity difference (IID), the interaural time delay (ITD), or a combination thereof, between the first audio signal 305 and the second audio signal 306. In this case, the user 301 may recognize the direction in the three-dimensional space 307 with respect to the output notification. Further, the notification module 360 may trigger a visual notification on the display 261 and/or haptic feedback through haptic module 179.

In an embodiment, the motion detection module 370 may detect information on a wearing state, a voice of the user 301, and/or a movement of the user 301 through the sensor circuits 252 and 253.

In an embodiment, the noise cancellation control module 380 may turn on and/or turn off a noise cancellation of the noise cancellation module 330, based on the information on the wearing state, the voice of the user 301, and/or the movement of the user 301, which are identified for a specified period.

In an embodiment, the noise cancellation control module 380 may turn off the noise cancellation of the noise cancellation module 330 based on the information on the worn state identified after providing the notification about the specified audio signal. For example, the noise cancellation control module 380 may turn off the noise cancellation of the noise cancellation module 330 based on determining that at least one of the first wireless audio device 202 and the second wireless audio device 203 is released from the wearing state.

In an embodiment, the noise cancellation control module 380 may turn off the noise cancellation of the noise cancellation module 330 based on a response of the user 301 to at least one speaker who utters the specified audio included in the audio signal 304 for a specified period.

In an embodiment, the noise cancellation control module 380 may turn off the noise cancellation of the noise cancellation module 330 based on the movement of the user 301 identified after providing the notification about the specified audio signal.

For example, the noise cancellation control module 380 may turn off the noise cancellation of the noise cancellation module 330 based on determining that a portion (e.g., a head) of the body of the user 301 rotates in the direction of the notification and/or the direction of the audio signal 304 for a specified period.

For example, the noise cancellation control module 380 may turn off the noise cancellation of the noise cancellation module 330 based on the movement of the user 301 in the direction of the notification and/or the direction of the audio signal 304 for the specified period.

For example, the noise cancellation control module 380 may turn off the noise cancellation of the noise cancellation module 330 based on the movement of the user 301 in a direction opposite to the direction of the notification and/or the direction of the audio signal 304 for the specified period.

In an embodiment, the noise cancellation control module 380 may turn off the noise cancellation of the noise cancellation module 330 based on a first movement of the user 301 before the specified period and a second movement of the user 301 during the specified period.

For example, the noise cancellation control module 380 may turn off the noise cancellation of the noise cancellation module 330 based on determining that the second movement of the user 301 is different from the first movement of the user 301. For example, the first movement may be the movement (e.g., walking) of the user 301, and the second movement may be stopping of the user 301. For example, the first movement may be the movement (e.g., walking) of the user 301, and the second movement may be another movement (e.g., running) of the user 301.

In an embodiment, the noise cancellation control module 380 may reduce a volume of audio content output through the audio output circuits 272 and 273 when the noise cancellation of the noise cancellation module 330 is turned off. In an embodiment, the noise cancellation control module 380 may reduce a volume of audio content output through the audio output circuits 272 and 273 while the noise cancellation of the noise cancellation module 330 is turned off.

In an embodiment, the noise cancellation control module 380 may turn off the noise cancellation of the noise cancellation module 330 and then may turn on the noise cancellation of the noise cancellation module 330 based on the identification of a specified event. In an embodiment, the specified event may be identified based on information on a wearing state, a voice of the user 301, and/or a movement of the user 301. In an embodiment, the specified event may be an event triggering a command to turn on noise cancellation.

In an embodiment, the noise cancellation control module 380 may turn off the noise cancellation of the noise cancellation module 330 and then may turn on the noise cancellation of the noise cancellation module 330 based on information on the identified wearing state, the voice of the user 301, and/or the movement of the user 301.

In an embodiment, the noise cancellation control module 380 may turn off the noise cancellation of the noise cancellation module 330 and then may turn on the noise cancellation of the noise cancellation module 330 based on information on the identified wearing state. For example, the noise cancellation control module 380 may turn on the noise cancellation of the noise cancellation module 330 based on the wireless audio device (e.g., the first wireless audio device 202) being worn again, after the noise cancellation of the noise cancellation module 330 is turned off.

In an embodiment, the noise cancellation control module 380 may turn on the noise cancellation of the noise cancellation module 330, based on the utterance of at least one speaker and/or the utterance of the user 301 not being identified for a specified time, after the noise cancellation of the noise cancellation module 330 is turned off.

In an embodiment, the noise cancellation control module 380 may turn on the noise cancellation of the noise cancellation module 330, based on the movement of the user 301 identified after turning off the noise cancellation of the noise cancellation module 330.

For example, based on the rotation of a body portion (e.g., a head) of the user 301 in the first direction after the noise cancellation of the noise cancellation module 330 is turned off, the noise cancellation control module 380 may turn on the noise cancellation of the noise cancellation module 330. In an embodiment, the first direction may be a direction distinct from the direction of the notification and/or the direction of the audio signal 304. In an embodiment, the first direction may be a direction of a movement of the user 301 for recovering the movement of the user 301 according to the direction of the notification and/or the direction of the audio signal 304.

For example, based on determining that the user 301 moves in the direction of the notification and/or the direction of the audio signal 304 after turning off the noise cancellation of the noise cancellation module 330, the noise cancellation control module 380 may turn on the noise cancellation of the noise cancellation module 330.

For example, based on determining that the user 301 moves in a direction opposite to the direction of the notification and/or the direction of the audio signal 304 after turning off the noise cancellation of the noise cancellation module 330, the noise cancellation control module 380 may turn on the noise cancellation of the noise cancellation module 330.

In an embodiment, the noise cancellation control module 380 may turn on the noise cancellation of the noise cancellation module 330, based on a third movement of the user 301 after turning off the noise cancellation of the noise cancellation module 330.

In an embodiment, based on a comparison result between the third movement of the user 301 after turning off the noise cancellation of the noise cancellation module 330 and the first movement of the user 301 before a specified period, the noise cancellation control module 380 may turn on the noise cancellation of the noise cancellation module 330. For example, the noise cancellation control module 380 may turn on the noise cancellation of the noise cancellation module 330 based on determining that the third movement of the user 301 is the same as the first movement of the user 301.

In an embodiment, based on a comparison result between the third movement of the user 301 after turning off the noise cancellation of the noise cancellation module 330 and the second movement of the user 301 during a specified period, the noise cancellation control module 380 may turn on the noise cancellation of the noise cancellation module 330. For example, the noise cancellation control module 380 may turn on the noise cancellation of the noise cancellation module 330 based on determining that the third movement of the user 301 is different from the second movement of the user 301.

In an embodiment, the noise cancellation control module 380 may increase a volume of audio content output through the audio output circuits 272 and 273 when the noise cancellation of the noise cancellation module 330 is turned on.

Figure 4:
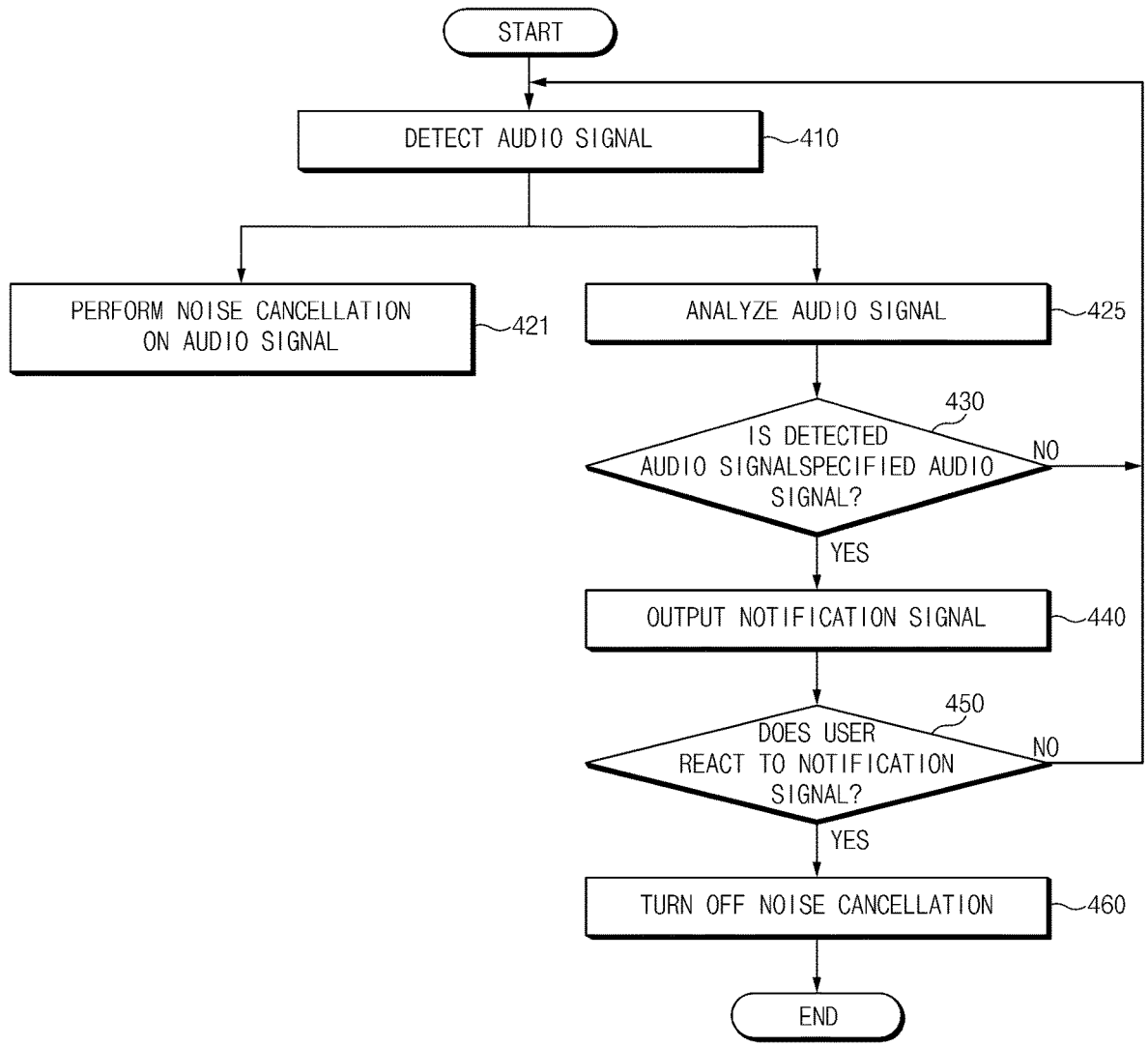
FIG. 4 is a flowchart for describing an operation in which a wireless audio device, according to an embodiment of the disclosure provides responsiveness to an outside sound.

FIG. 4 is a flowchart for describing an operation in which the wireless audio device 204, according to an embodiment of the disclosure, provides responsiveness to an outside sound. Operations of FIG. 4 may be performed by the wireless audio device 204.

Referring to FIG. 4, at operation 410, the wireless audio device 204 may detect an audio signal. In an embodiment, the wireless audio device 204 may detect an externally generated audio signal. In an embodiment, the wireless audio device 204 may detect an externally generated audio signal through the audio receiving circuits 282 and 283.

At operation 421, the wireless audio device 204 may perform noise cancellation on the audio signal. In an embodiment, the wireless audio device 204 may perform noise cancellation on the audio signal by outputting an audio signal for reducing (or canceling) the audio signal through the audio output circuits 272 and 273.

At operation 425, the wireless audio device 204 may analyze the audio signal.

In an embodiment, the wireless audio device 204 may identify whether the specified audio signal is included in the audio signal and/or the type of the specified audio signal. According to an embodiment, the specified audio signal may include an audio signal indicating a specified keyword. According to an embodiment, the specified audio signal may include an audio signal of a specified pattern.

In an embodiment, the wireless audio device 204 may estimate the direction of the audio signal. In an embodiment, the wireless audio device 204 may estimate the direction of the audio signal, based on the interaural intensity difference (IID), the interaural time delay (ITD), or a combination thereof, between audio signals received through the audio receiving circuits 282 and 283.

At operation 430, the wireless audio device 204 may identify whether the detected audio signal is the specified audio signal.

At operation 430, when it is determined that the detected audio signal is the specified audio signal (determining Yes), the wireless audio device 204 may proceed to operation 440. At operation 430, when it is not determined that the detected audio signal is the specified audio signal (determining No), the wireless audio device 204 may proceed to operation 410.

At operation 440, the wireless audio device 204 may output the notification signal. In an embodiment, the wireless audio device 204 may output a notification signal based on the direction of the audio signal.

In an embodiment, the wireless audio device 204 may output a notification signal indicating that a specified audio signal is identified. In an embodiment, the notification signal may be an audio signal. Alternatively, the notification signal can trigger an update to display 261 and/or haptic feedback through haptic module 179.

In an embodiment, the wireless audio device 204 may generate text data indicating that a specified audio signal is identified, and may change the generated text data into audio data. In an embodiment, the wireless audio device 204 may output audio data through the audio output circuits 272 and 273.

At operation 450, the wireless audio device 204 may identify whether the user is responsive to the notification signal.

In an embodiment, the wireless audio device 204 may identify whether the user is responsive to the notification signal based on information on a wearing state detected through the sensor circuits 252 and 253, a voice of the user 301, and/or a movement of the user 301.

In an embodiment, the wireless audio device 204 may identify information on a wearing state, a voice of the user 301, and/or a movement of the user 301 during a specified period. In an embodiment, the specified period may be a predetermined time interval after providing the notification signal to the user.

At operation 450, when a user reaction to the notification signal is identified (determining Yes), the wireless audio device 204 may proceed to operation 460. At operation 450, when a user reaction to the notification signal is not identified (determining No), the wireless audio device 204 may proceed to operation 410.

At operation 460, the wireless audio device 204 may turn off noise cancellation. In an embodiment, the wireless audio device 204 may not perform the noise cancellation on the audio signal by stopping the output of an audio signal for reducing (or canceling) the audio signal.

Figure 5:
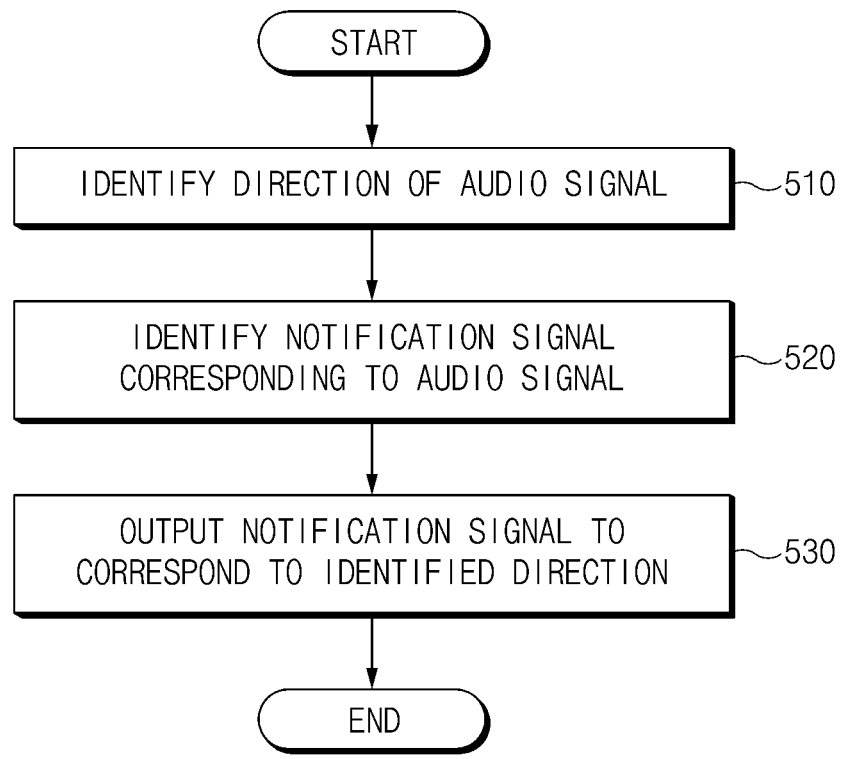
FIG. 5 is a flowchart for describing an operation in which a wireless audio device, according to an embodiment of the disclosure outputs a notification signal.

FIG. 5 is a flowchart for describing an operation in which the wireless audio device 204, according to an embodiment of the disclosure, outputs a notification signal. Operations of FIG. 5 may be performed by the wireless audio device 204. The operations of FIG. 5 may be included in operation 440 of FIG. 4.

Referring to FIG. 5, at operation 510, the wireless audio device 204 may identify a direction of an audio signal. In an embodiment, the wireless audio device 204 may identify the direction of the audio signal, based on the interaural intensity difference (IID), the interaural time delay (ITD), or a combination thereof, between audio signals received through the audio receiving circuits 282 and 283.

At operation 520, the wireless audio device 204 may identify a notification signal corresponding to the audio signal. In an embodiment, the wireless audio device 204 may identify a notification signal corresponding to the audio signal based on a keyword included in the audio signal and/or a pattern of the audio signal.

At operation 530, the wireless audio device 204 may output a notification signal to correspond to the identified direction. In an embodiment, the wireless audio device 204 may output a notification signal such that the interaural intensity difference (IID), the interaural time delay (ITD), or a combination thereof, between the notification output through the audio output circuit 272 and the notification output through the audio output circuit 273 correspond to the interaural intensity difference (IID), the interaural time delay (ITD), or a combination thereof, between the received audio signals.

Figure 6:
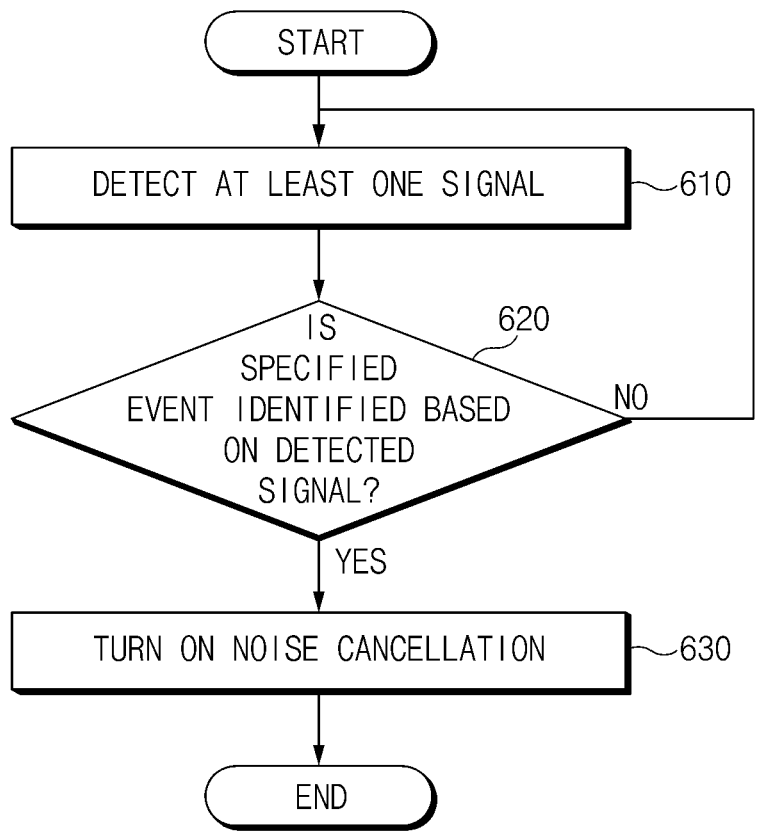
FIG. 6 is a flowchart for describing an operation in which a wireless audio device, according to an embodiment of the disclosure turns on noise cancellation.

FIG. 6 is a flowchart for describing an operation in which the wireless audio device 204, according to an embodiment of the disclosure turns on noise cancellation. Operations of FIG. 6 may be performed by the wireless audio device 204. The operations of FIG. 6 may be performed after operation 460 of FIG. 4, for example.

Referring to FIG. 6, at operation 610, the wireless audio device 204 may detect at least one signal. In an embodiment, the wireless audio device 204 may detect at least one signal through the sensor circuits 252 and 253.

At operation 620, the wireless audio device 204 may identify a specified event based on the detected signal. In an embodiment, the specified event may be identified based on information on a wearing state, a voice of the user 301, and/or a movement of the user 301. In an embodiment, the specified event may be an event triggering a command to turn on noise cancellation.

In an embodiment, the specified event may be an identification of a situation in which the unworn wireless audio device (e.g., the first wireless audio device 202) is worn again after the noise cancellation is turned off.

In an embodiment, the specified event may be an identification of a situation in which a portion (e.g., a head) of the body of the user 301 rotates in the first direction after noise cancellation is turned off. In an embodiment, the first direction may be a direction distinct from the direction of the notification and/or the direction of the audio signal 304. In an embodiment, the first direction may be a direction of a movement of the user 301 for recovering the movement of the user 301 according to the direction of the notification and/or the direction of the audio signal 304.

In an embodiment, the specified event may be an identification of a situation in which the user 301 moves in the direction of the notification and/or the direction of the audio signal 304 after the noise cancellation is turned off. In an embodiment, the specified event may be an identification of a situation in which the user 301 moves in a direction opposite to the direction of the notification and/or the direction of the audio signal 304 after the noise cancellation is turned off. In an embodiment, the specified event may be an identification indicating that the movement of the user 301 after the noise cancellation is turned off is difference from the movement of the user 301 during an immediately preceding specified period.

At operation 620, when the specified event is identified (determining Yes), the wireless audio device 204 may proceed to operation 630. At operation 620, when the specified event is not identified (determining No), the wireless audio device 204 may proceed to operation 610.

At operation 630, the wireless audio device 204 may turn on the noise cancellation. In an embodiment, the wireless audio device 204 may perform noise cancellation on the audio signal by outputting an audio signal for reducing (or canceling) the audio signal through the audio output circuits 272 and 273.

Figure 7:
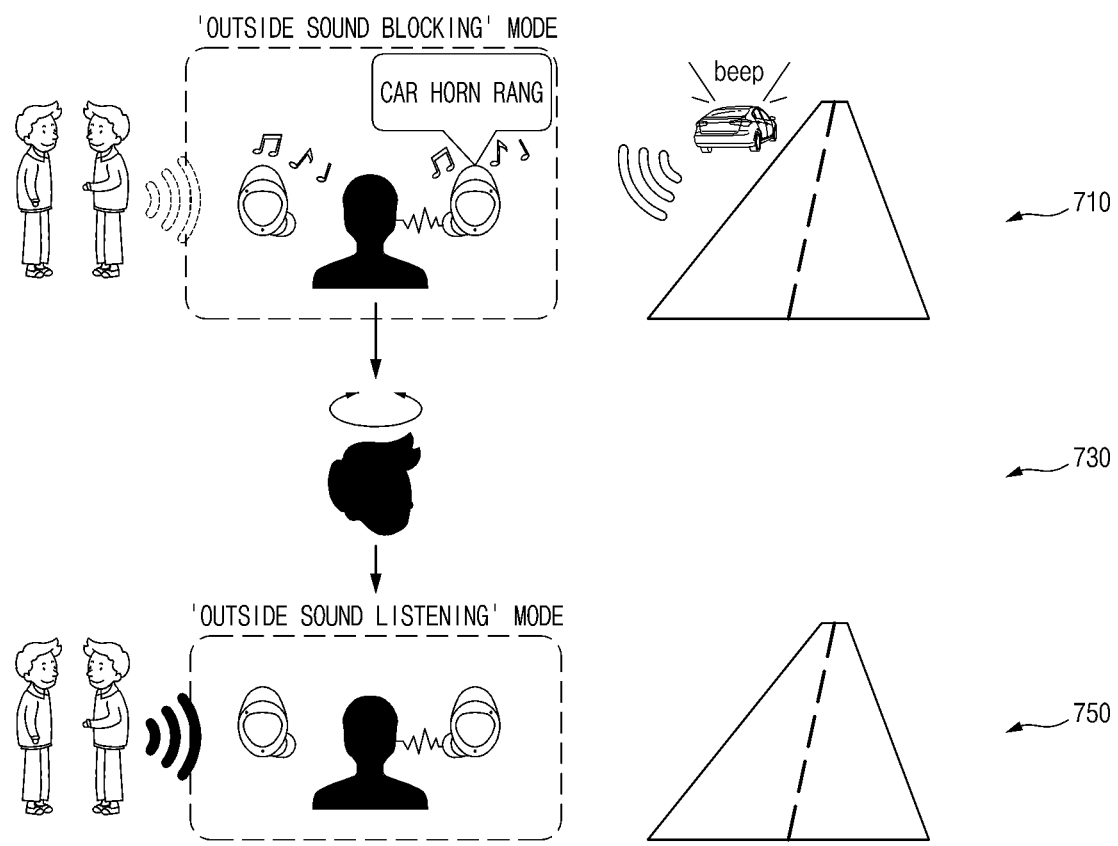
FIG. 7 is a diagram illustrating a usage situation of a wireless audio device, according to an embodiment of the disclosure.

FIG. 7 is a diagram illustrating a usage situation of a wireless audio device, according to an embodiment of the disclosure.

A first situation 710 may exemplify a state in which the user wears the wireless audio device. The wireless audio device in the first situation 710 may be the wireless audio device 204 described in FIGS. 2 to 6.

In the first situation 710, the wireless audio device may operate in an outside sound blocking mode. In an embodiment, the outside sound blocking mode may be a mode in which noise cancellation is performed on an outside audio signal.

In the first situation 710, sounds of neighboring speakers talking to each other may be blocked by the outside sound blocking mode.

In the first situation 710, a horn (beep) by any vehicle may be identified by the wireless audio device. In this case, the wireless audio device provides a notification (e.g., a car horn rang) to the user.

A second situation 730 may exemplify a state in which the user responds to the notification. In the second situation 730, the user may move the user's head in a direction in which the notification is provided.

A third situation 750 may exemplify a situation in which the wireless audio device operates in an outside sound listening mode according to a user's reaction. In an embodiment, the outside sound listening mode may be a mode in which noise cancellation is not performed on an outside audio signal.

In the third situation 750, sounds of neighboring speakers talking to each other may be provided to the user through the outside sound listening mode.

Figure 8:
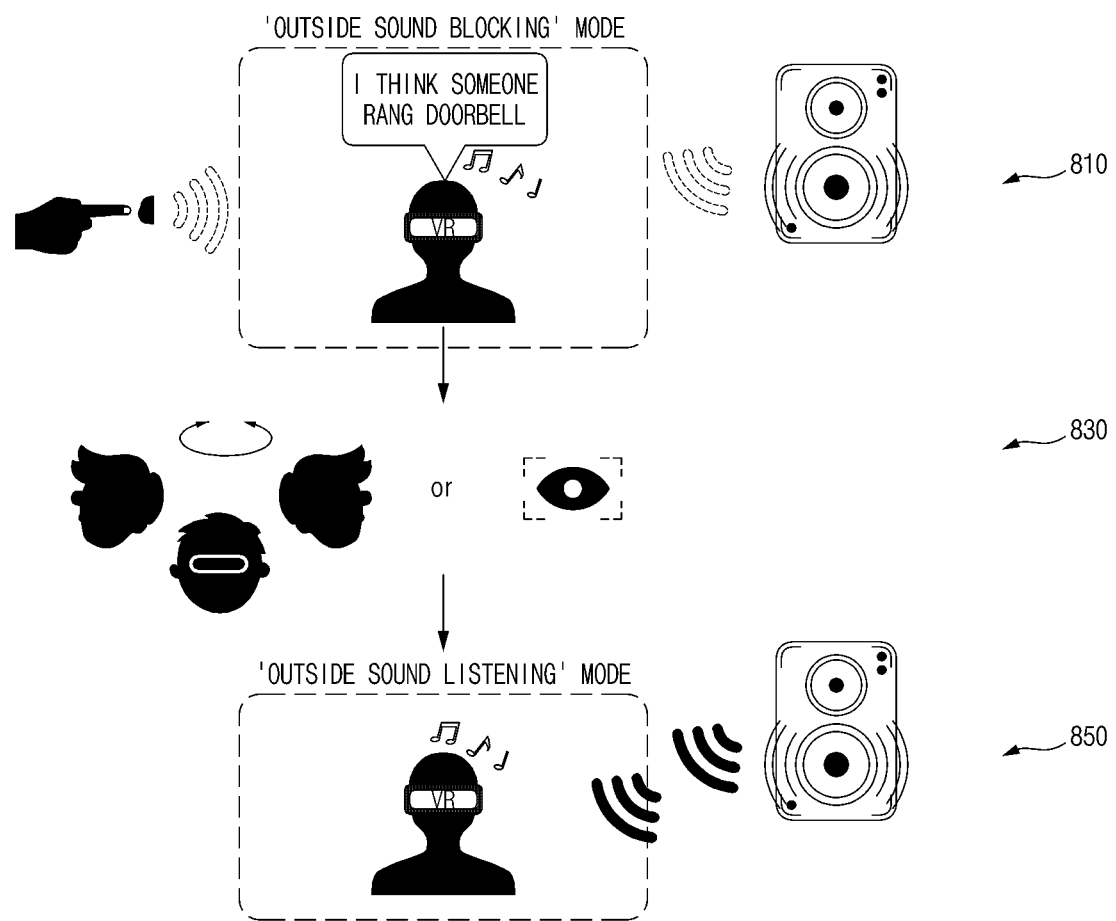
FIG. 8 is a diagram illustrating a usage situation of a wearable device, according to an embodiment of the disclosure.

FIG. 8 is a diagram illustrating a usage situation of a wearable device, according to an embodiment of the disclosure.

A first situation 810 may exemplify a state in which the user wears a wearable device. The wearable device in the first situation 810 may be a head mounted display. In an embodiment, the wearable device in the first situation 810 may provide functions of the wireless audio device 204 described with reference to FIGS. 2 to 6.

In the first situation 810, the wearable device may operate in an outside sound blocking mode. In an embodiment, the outside sound blocking mode may be a mode in which noise cancellation is performed on an outside audio signal.

In the first situation 810, a sound output from a nearby speaker may be blocked by the outside sound blocking mode.

In the first situation 810, a sound of a doorbell by an arbitrary doorbell may be identified by the wearable device. In this case, the wearable device may provide a notification (e.g., I think someone rang the doorbell) to the user. The notification may be provided in an audio and/or visual format.

A second situation 830 may exemplify a state in which the user responds to the notification. In the second situation 830, the user may move the user's head in a direction in which the notification is provided. In the second situation 830, the user may make a specified gesture (e.g., blinking an eye).

A third situation 850 may exemplify a situation in which the wireless audio device operates in an outside sound listening mode according to a user's reaction. In an embodiment, the outside sound listening mode may be a mode in which noise cancellation is not performed on an outside audio signal.

In the third situation 850, a sound output from a surrounding speaker may be provided to the user by the outside sound listening mode.

The wireless audio device 204 according to an embodiment of the disclosure includes the at least one microphone 81a, 81b, and 81c, the at least one speaker 70, the at least one sensor 50, the processor 222 or 223, and the memory 232 or 233 that stores instructions, and the instructions that, when executed by the processor 222 or 223, cause the wireless audio device 204, while a sound for reducing an outside sound acquired through the at least one microphone 81a, 81b, and 81c is output through the at least one speaker 70, to identify a specified outside sound of the outside sound acquired through the at least one microphone 81a, 81b, and 81c, to output a notification sound for indicating that the specified outside sound is identified through the at least one speaker 70, to identify a motion of a user of the wireless audio device 204 through the at least one sensor 50, in response to outputting the notification sound, and to stop the output of the sound for reducing the outside sound based on the identified motion. Processing performed by each of the processors 222, 223 can be independently executed such that actions performed by the first wireless audio device 202 are separate from actions performed by the second wireless audio device 203. Alternatively, the processing can be distributed between the processors 222, 223. As another alternative, at least a portion of the processing can be offloaded to another processor, such as processor 221, as part of distributed processing tasks 355.

The outside sound may be received in a first audio signal 305 and a second audio signal 306. In an embodiment, the instructions, when executed by the processor 222 or 223, may cause the wireless audio device 204 to identify a direction of the specified outside sound based on the first audio signal 305 and the second audio signal 306, and to output the notification sound through the at least one speaker 70 based on the identified direction. For example, the outside sound may be detected through either or both of the audio receiving circuits 282, 283, and the notification sound may be directed to the speaker 70 of the first wireless audio device 202 or the second wireless audio device 203 depending on the direction of the sound relative to the position of the user. The outside sound can be acquired through the at least one microphone 81a, 81b, and 81c of the first wireless audio device 202 and/or the second wireless audio device 203. As a further example, where the outside sound is acquired by a microphone of the first wireless audio device 202 in the first audio signal 305 and the outside sound is acquired by a microphone of the second wireless audio device 203 in the second audio signal 306, the second audio signal 306 may be sent from the second wireless audio device 203 to the first wireless audio device 202 (e.g., via third link 215) for the processor 222 to analyze the first audio signal 305 and the second audio signal 306. As another alternative, the first wireless audio device 202 can send the first audio signal 305 to the second wireless audio device 203 (e.g., via third link 215) for the processor 223 to analyze the first audio signal 305 and the second audio signal 306.

In an embodiment, the instructions, when executed by the processor 222 or 223, may cause the wireless audio device 204 to identify a motion of a specified object of the user after outputting the notification sound, and to stop the output of the sound for reducing the outside sound based on determining that the motion of the specified object is directed in the identified direction.

In an embodiment, the instructions, when executed by the processor 222 or 223, may cause the wireless audio device 204 to identify a first motion of the user before outputting the notification sound, to identify a second motion of the user after outputting the notification sound, and to stop the output of the sound for reducing the outside sound based on determining that the second motion of the user is different from the first motion.

In an embodiment, the instructions, when executed by the processor 222 or 223, may cause the wireless audio device 204 to identify a third motion of the user after stopping the output of the sound for reducing the outside sound, and to output the sound for reducing the outside sound through the at least one speaker 70 based on determining that the third motion of the user corresponds to the first motion.

In an embodiment, the instructions, when executed by the processor 222 or 223, may cause the wireless audio device 204 to identify a first utterance of the user and/or a second utterance of another user who utters the specified outside sound through the at least one microphone 81a, 81b, and 81c, after stopping the output of the sound for reducing the outside sound, and to output the sound for reducing the outside sound acquired through the at least one microphone 81a, 81b, and 81c through the at least one speaker 70 based on the first utterance and/or the second utterance not being identified for a specified time. For example, the utterances may only be detectable by one of the microphones 81a, 81b, and 81c and may be passed through or reduced through the speaker 70 of either or both of the first wireless audio device 202 and the second wireless audio device 203.

In an embodiment, the instructions, when executed by the processor 222 or 223, may cause the wireless audio device 204 to identify another motion of the user through the at least one sensor 50 after stopping the output of the sound for reducing the outside sound, and to output the sound for reducing the outside sound acquired through the at least one microphone 81a, 81b, and 81c through the at least one speaker 70 based on the another motion being identified as to restore movement of the user according to the motion.

In an embodiment, the instructions, when executed by the processor 222 or 223, may cause the wireless audio device 204 to identify a position of the wireless audio device 204 through the at least one sensor, and to determine the specified outside sound corresponding to the identified position among a plurality of specified outside sounds.

In an embodiment, the instructions, when executed by the processor 222 or 223, may cause the wireless audio device 204 to decrease a volume of an audio content output through the at least one speaker 70 while stopping the output of the sound for reducing the outside sound.

In an embodiment, the instructions, when executed by the processor 222 or 223, may cause the wireless audio device 204 to identify a specified text for indicating that the specified outside sound is identified, to convert the identified text into an audio signal, and to output the audio signal as the notification sound through the at least one speaker 70.

A method of operating the wireless audio device 204 according to an embodiment of the disclosure, includes, while a sound for reducing an outside sound acquired through at least one microphone 81a, 81b, and 81c of the wireless audio device 204 is output through at least one speaker 70 of the wireless audio device 204, identifying a specified outside sound of the outside sound acquired through the at least one microphone 81a, 81b, and 81c, outputting a notification sound for indicating that the specified outside sound is identified through the at least one speaker 70, identifying a motion of a user of the wireless audio device 204 through the at least one sensor 50 of the wireless audio device 204, in response to outputting the notification sound, and stopping the output of the sound for reducing the outside sound based on the identified motion.

The method of operating the wireless audio device 204 according to an embodiment of the disclosure, may further include identifying a direction of the specified outside sound based on a first audio signal 305 and a second audio signal 306, where the outside sound is received in the first audio signal 305 and the second audio signal 306, and outputting the notification sound through the at least one speaker 70 based on the identified direction.

The method of operating the wireless audio device 204 according to an embodiment of the disclosure, may further include identifying a motion of a specified object of the user after outputting the notification sound, and stopping the output of the sound for reducing the outside sound based on determining that the motion of the specified object is directed in the identified direction.

The method of operating the wireless audio device 204 according to an embodiment of the disclosure, may further include identifying a first motion of the user before outputting the notification sound, identifying a second motion of the user after outputting the notification sound, and stopping the output of the sound for reducing the outside sound based on determining that the second motion of the user is different from the first motion.

The method of operating the wireless audio device 204 according to an embodiment of the disclosure, may further include identifying a third motion of the user after stopping the output of the sound for reducing the outside sound, and outputting the sound for reducing the outside sound through the at least one speaker 70 based on determining that the third motion of the user corresponds to the first motion.

The method of operating the wireless audio device 204 according to an embodiment of the disclosure, may further include identifying a first utterance of the user and/or a second utterance of another user who utters the specified outside sound through the at least one microphone 81a, 81b, and 81c, after stopping the output of the sound for reducing the outside sound, and outputting the sound for reducing the outside sound acquired through the at least one microphone 81a, 81b, and 81c through the at least one speaker 70 based on the first utterance and/or the second utterance not being identified for a specified time.

The method of operating the wireless audio device 204 according to an embodiment of the disclosure, may further include identifying another motion of the user through the at least one sensor after stopping the output of the sound for reducing the outside sound, and outputting the sound for reducing the outside sound acquired through the at least one microphone 81a, 81b, and 81c through the at least one speaker 70 based on which the another motion is identified as to restore movement of the user according to the motion.

The method of operating the wireless audio device 204 according to an embodiment of the disclosure, may further include identifying a position of the wireless audio device 204 through the at least one sensor 50, and determining the specified outside sound corresponding to the identified position among a plurality of specified outside sounds.

The method of operating the wireless audio device 204 according to an embodiment of the disclosure, may further include decreasing a volume of an audio content output through the at least one speaker 70 while stopping the output of the sound for reducing the outside sound.

The method of operating the wireless audio device 204 according to an embodiment of the disclosure, may further include identifying a specified text for indicating that the specified outside sound is identified, converting the identified text into an audio signal, and outputting the audio signal as the notification sound through the at least one speaker 70.

A wireless audio system, such as the wireless audio device 204, can include at least two microphones 81a, 81b, 81c, at least two speakers 70, at least one sensor 50, at least one processor 222, 223, and at least one memory 232, 233 which stores instructions. The instructions that, when executed by the at least one processor 222, 223, cause the wireless audio system, while a sound for reducing an outside sound acquired through one or more of the at least two microphones 81a, 81b, 81c is output through one or more of the at least two speakers 70, to identify a specified outside sound of the outside sound acquired, to output a notification for indicating that the specified outside sound is identified, to identify a motion of a user of the wireless audio system through the at least one sensor 50, in response to outputting the notification, and to stop the output of the sound for reducing the outside sound based on the identified motion. As an example, the wireless audio system can include the first wireless audio device 202 and the second wireless audio device 203, where processing is performed by either or both of the processors 222, 223 based on instructions stored in memory 232, 233. Further, the wireless audio system can include processing resources of other devices, such as processor 221 and memory 231 of electronic device 201. Thus, the user can hear different sound outputs through each of the speakers 70 of the first wireless audio device 202 and the second wireless audio device 203. Notifications can be provided to either or both of the speakers 70 of the first wireless audio device 202 and the second wireless audio device 203. Further, notifications can be output as a visual notification on the display 261 and/or haptic feedback through haptic module 179.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wireless audio device comprising:
   at least one microphone;
   at least one speaker;
   at least one sensor;
   a processor; and
   a memory which stores instructions,
   wherein the instructions that, when executed by the processor, cause the wireless audio device to:
   while a sound for reducing an outside sound acquired through the at least one microphone is output through the at least one speaker:
      identify a specified outside sound of the outside sound acquired through the at least one microphone;
      output a notification sound for indicating that the specified outside sound is identified through the at least one speaker; and
      identify a motion of a user of the wireless audio device through the at least one sensor, in response to outputting the notification sound; and
   stop the output of the sound for reducing the outside sound based on the identified motion.

2. The wireless audio device of claim 1, wherein the outside sound is received in a first audio signal and a second audio signal, and the instructions that, when executed by the processor, cause the wireless audio device to:
   identify a direction of the specified outside sound based on the first audio signal and the second audio signal; and
   output the notification sound through the at least one speaker based on the identified direction.

3. The wireless audio device of claim 2, wherein the instructions that, when executed by the processor, cause the wireless audio device to:
   identify a motion of a specified object of the user after outputting the notification sound; and stop the output of the sound for reducing the outside sound based on determining that the motion of the specified object is directed in the identified direction.

4. The wireless audio device of claim 1, wherein the instructions that, when executed by the processor, cause the wireless audio device to:
identify a first motion of the user before outputting the notification sound;
identify a second motion of the user after outputting the notification sound; and
stop the output of the sound for reducing the outside sound based on determining that the second motion of the user is different from the first motion.

5. The wireless audio device of claim 4, wherein the instructions that, when executed by the processor, cause the wireless audio device to:
identify a third motion of the user after stopping the output of the sound for reducing the outside sound; and
output the sound for reducing the outside sound through the at least one speaker based on determining that the third motion of the user corresponds to the first motion.

6. The wireless audio device of claim 1, wherein the instructions that, when executed by the processor, cause the wireless audio device to:
identify a first utterance of the user and/or a second utterance of another user who utters the specified outside sound through the at least one microphone, after stopping the output of the sound for reducing the outside sound; and
output the sound for reducing the outside sound acquired through the at least one microphone through the at least one speaker based on the first utterance and/or the second utterance not being identified for a specified time.

7. The wireless audio device of claim 1, wherein the instructions that, when executed by the processor, cause the wireless audio device to:
identify another motion of the user through the at least one sensor after stopping the output of the sound for reducing the outside sound; and
output the sound for reducing the outside sound acquired through the at least one microphone through the at least one speaker based on the another motion being identified as to restore movement of the user according to the motion.

8. The wireless audio device of claim 1, wherein the instructions that, when executed by the processor, cause the wireless audio device to:
identify a position of the wireless audio device through the at least one sensor; and
determine the specified outside sound corresponding to the identified position among a plurality of specified outside sounds.

9. The wireless audio device of claim 1, wherein the instructions that, when executed by the processor, cause the wireless audio device to:
decrease a volume of an audio content output through the at least one speaker while stopping the output of the sound for reducing the outside sound.

10. The wireless audio device of claim 1, wherein the instructions that, when executed by the processor, cause the wireless audio device to:
identify a specified text for indicating that the specified outside sound is identified;
convert the identified text into an audio signal; and
output the audio signal as the notification sound through the at least one speakers.

11. A method of operating a wireless audio device, the method comprising:
while a sound for reducing an outside sound acquired through at least one microphone of the wireless audio device is output through at least one speaker of the wireless audio device:
identifying a specified outside sound of the outside sound acquired through the at least one microphone;
outputting a notification sound for indicating that the specified outside sound is identified through the at least one speaker; and
identifying a motion of a user of the wireless audio device through at least one sensor of the wireless audio device, in response to outputting the notification sound; and
stopping the output of the sound for reducing the outside sound based on the identified motion.

12. The method of claim 11, comprising:
identifying a direction of the specified outside sound based on a first audio signal and a second audio signal, wherein the outside sound is received in the first audio signal and the second audio signal; and
outputting the notification sound through the at least one speaker based on the identified direction.

13. The method of claim 12, comprising:
identifying a motion of a specified object of the user after outputting the notification sound; and
stopping the output of the sound for reducing the outside sound based on determining that the motion of the specified object is directed in the identified direction.

14. The method of claim 11, comprising:
identifying a first motion of the user before outputting the notification sound;
identifying a second motion of the user after outputting the notification sound;
stopping the output of the sound for reducing the outside sound based on determining that the second motion of the user is different from the first motion;
identifying a third motion of the user after stopping the output of the sound for reducing the outside sound; and
outputting the sound for reducing the outside sound through the at least one speaker based on determining that the third motion of the user corresponds to the first motion.

15. The method of claim 11, comprising:
identifying a first utterance of the user and/or a second utterance of another user who utters the specified outside sound through the at least one microphone, after stopping the output of the sound for reducing the outside sound; and
outputting the sound for reducing the outside sound acquired through the at least one microphone through the at least one speaker based on the first utterance and/or the second utterance not being identified for a specified time.

16. The method of claim 11, comprising:
identifying another motion of the user through the at least one sensor after stopping the output of the sound for reducing the outside sound; and
outputting the sound for reducing the outside sound acquired through the at least one microphone through the at least one speaker based on the another motion being identified as to restore movement of the user according to the motion.

17. The method of claim 11, comprising:
identifying a position of the wireless audio device through the at least one sensor; and determining the specified outside sound corresponding to the identified position among a plurality of specified outside sounds.

18. The method of claim 11, comprising:
decreasing a volume of an audio content output through the at least one speaker while stopping the output of the sound for reducing the outside sound.

19. The method of claim 11, comprising:
identifying a specified text for indicating that the specified outside sound is identified;
converting the identified text into an audio signal; and
outputting the audio signal as the notification sound through the at least one speaker.

20. A wireless audio system comprising:
at least two microphones;
at least two speakers;
at least one sensor;
at least one processor; and
at least one memory which stores instructions,
wherein the instructions that, when executed by the at least one processor, cause the wireless audio system to:
while a sound for reducing an outside sound acquired through one or more of the at least two microphones is output through one or more of the at least two speakers:
identify a specified outside sound of the outside sound acquired;
output a notification for indicating that the specified outside sound is identified; and
identify a motion of a user of the wireless audio system through the at least one sensor, in response to outputting the notification; and
stop the output of the sound for reducing the outside sound based on the identified motion.

* * * * *